US012521305B1

(12) United States Patent
Zhao

(10) Patent No.: US 12,521,305 B1
(45) Date of Patent: Jan. 13, 2026

(54) MULTI-POINT STIMULATING SEX PRODUCT

(71) Applicant: Dongguan Rijie Electronic Technology Co., Ltd., Guangdong (CN)

(72) Inventor: Quan Zhao, Dongguan (CN)

(73) Assignee: Dongguan Rijie Electronic Technology Co., Ltd., Guangdong (CN)

( * ) Notice: Subject to any disclaimer, the term of this patent is extended or adjusted under 35 U.S.C. 154(b) by 0 days.

(21) Appl. No.: 18/964,776

(22) Filed: Dec. 2, 2024

(30) Foreign Application Priority Data

Oct. 14, 2024 (CN) ......................... 202422484576.1

(51) Int. Cl.
*A61H 19/00* (2006.01)

(52) U.S. Cl.
CPC ....... *A61H 19/34* (2013.01); *A61H 2201/123* (2013.01)

(58) Field of Classification Search
CPC .. A61H 19/34; A61H 2201/123; A61H 19/30; A61H 19/00; A61H 19/40–44; A61H 19/32; A61H 19/50; A61H 21/00; A61H 23/0254; A61H 7/005; A61H 2201/149; A61H 2201/1665; A61H 2201/1669; A61H 2201/1666; A61H 2201/1676; A61H 2205/087; A61H 7/007; A61H 7/008
USPC .......................... 600/38–41; 601/84, 134, 46
See application file for complete search history.

(56) References Cited

U.S. PATENT DOCUMENTS 6,733,466 B2 * 5/2004 Huang ............... A61H 23/0254 601/111
11,554,073 B1 * 1/2023 Guo ....................... A61H 7/005
12,161,598 B1 * 12/2024 Wang ................. A61H 23/0263
(Continued)

FOREIGN PATENT DOCUMENTS

CN 118105288 A * 5/2024 ............. A61H 7/007
DE 202023107383 U1 * 1/2024 ............. A61H 19/32

OTHER PUBLICATIONS

An English Machine Translation of DE-202023107383-U1 was taken from the USPTO Fit Database on Jun. 23, 2025. (Year: 2024).*
(Continued)

*Primary Examiner* — Justine R Yu
(74) *Attorney, Agent, or Firm* — Rondaus PLLC; George Liu

(57) ABSTRACT

A multi-point stimulating sex product having multi-claw message head is provided, the product includes a machine base, a sliding seat, a driving device, a claw arm and an elastic layer, wherein the machine base is provided with a guide hole in a vertical direction, the sliding seat is slidably mounted in the guide hole in the vertical direction, the driving device can drive the sliding seat to move in the vertical direction, a plurality of claw arms are provided, and a lower end of the claw arm is pivotally mounted on a side portion or an upper wall of the sliding seat; and the elastic layer is provided on an upper wall of the machine base, a massage head matched with the claw arm extends from the elastic layer, a plurality of massage heads are provided, a rear end of the massage head is provided with a clamping hole.

16 Claims, 7 Drawing Sheets

(56) References Cited

U.S. PATENT DOCUMENTS

| | | | | |
|---|---|---|---|---|
| 2024/0252384 | A1 * | 8/2024 | Zhou | A61H 7/008 |
| 2025/0161147 | A1 * | 5/2025 | Wang | A61H 7/007 |

OTHER PUBLICATIONS

An English Machine Translation of CN-118105288-A was taken from the USPTO Fit Database on Jun. 23, 2025. (Year: 2024).*

* cited by examiner

MULTI-POINT STIMULATING SEX PRODUCT

TECHNICAL FIELD

The present disclosure relates to the field of massagers, and in particular to a multi-point stimulating sex product.

BACKGROUND

Existing adult products generally stimulate sensitive spots of women (not limited to women) through buckling or telescoping. However, with increasing usage frequency, the experience of products on the market becomes relatively similar (typically single buckling or telescoping), thus affecting the user experience and failing to provide a richer sense of sexual stimulation, which reduces demand for use.

Of course, to enhance stimulation, some products adopt a structure combining double buckling or buckling and telescoping. However, their stimulation range remains limited, thereby affecting market competitiveness.

SUMMARY

The primary objective of the present disclosure is to provide a multi-point stimulating sex product designed to improve the structure of the multi-claw massage head. This innovation enables multi-point stimulation of sexual organs such as the clitoris and/or vaginal opening, simulating licking and buckling stimulations with a relatively gentle effect. Additionally, the stimulation frequency can be adjusted according to actual needs, enhancing the product's distinctiveness and market competitiveness.

To achieve the aforementioned objective, the present disclosure provides a multi-point stimulating sex product, comprising:

- a machine base, wherein the machine base is provided with a guide hole in a vertical direction;
- a sliding seat, wherein the sliding seat is slidably mounted in the guide hole in the vertical direction;
- a driving device, wherein the driving device is arranged below the sliding seat, and the driving device is used for driving the sliding seat to move in the vertical direction;
- a claw arm, a plurality of claw arms are provided, wherein a lower end of the claw arm is pivotally mounted on a side portion or an upper wall of the sliding seat; and
- an elastic layer, wherein the elastic layer is provided on an upper wall of the machine base, a massage head extends from the elastic layer, a plurality of massage heads are provided, the massage head is matched with the claw arm, a rear end of the massage head is provided with a clamping hole, and a front end of the claw arm extends into the clamping hole.

In practical design, when the sliding seat moves in the vertical direction, it drives the rear end of the claw arm to move in the same direction. Due to the limiting effect of the massage head on the front end of the claw arm, the reciprocating movement of the sliding seat causes the claw arm to swing back and forth, thus driving the massage head to swing back and forth to imitate the movement trajectory of the fingers (thereby enabling a plurality of claw arms to swing between positions close to or far away from each other). This design stimulates the vaginal opening and/or clitoris, simulates the touch of human fingers, and enhances the user experience.

Moreover, a single driving device can achieve simultaneous swinging of a plurality of claw arms, resulting in a simple and stable structure with a low profile, effectively ensuring the compactness of the product.

DETAILED DESCRIPTION OF THE EMBODIMENTS

The technical solutions in the embodiments of the present disclosure will be clearly and completely described below with reference to the accompanying drawings. Obviously, the described embodiments are only some of the embodiments of the present disclosure, not all of them. Based on the embodiments of the present disclosure, all other embodiments obtained by those skilled in the art without creative efforts fall within the scope of protection of the present disclosure.

It should be noted that if there are directional indications (such as up, down, left, right, front, back, top, bottom, inside, outside, vertical, transverse, longitudinal, counterclockwise, clockwise, circumferential, radial, axial . . . ), this directional indication is only used to explain the relative positional relationship, movement, etc. between the components in a specific posture (as shown in the accompanying drawings). If the specific posture changes, the directional indication also changes accordingly.

In addition, if there are descriptions involving "first" or "second" etc. in the embodiments of the present disclosure, the descriptions of "first" or "second" etc. are only for descriptive purposes and cannot be understood as instructions or implying its relative importance or implicitly specifying the quantity of the technical feature indicated. Therefore, features defined as "first" and "second" may explicitly or implicitly include at least one of these features. In addition, the technical solutions in various embodiments may be combined with each other, provided that such combinations are realizable by those skilled in the art. Where the combination of technical solutions is contradictory or unfeasible, it shall be deemed that such a combination does not exist and is not within the scope of protection required by the present disclosure.

Figure 1:
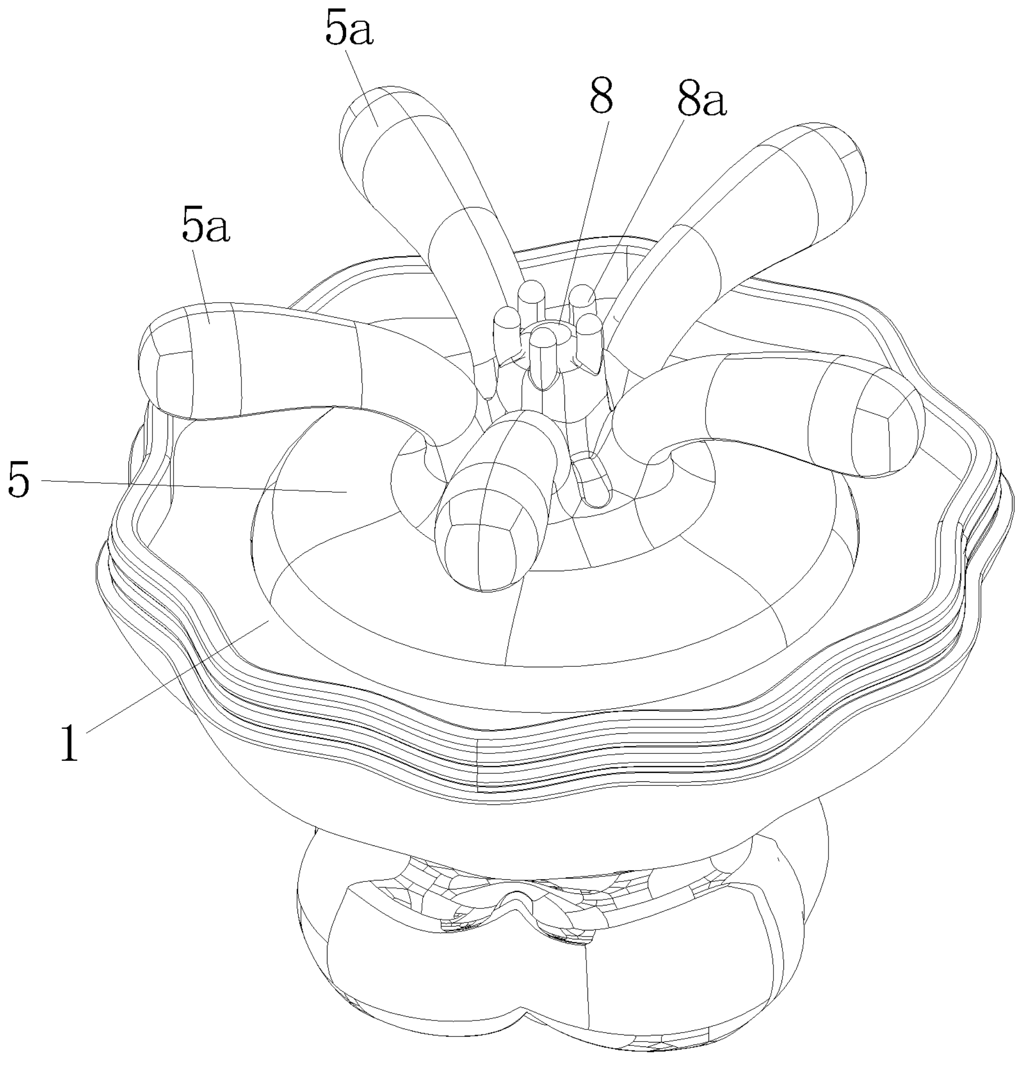
FIG. 1 is a three-dimensional schematic diagram of the present disclosure.
Figure 2:
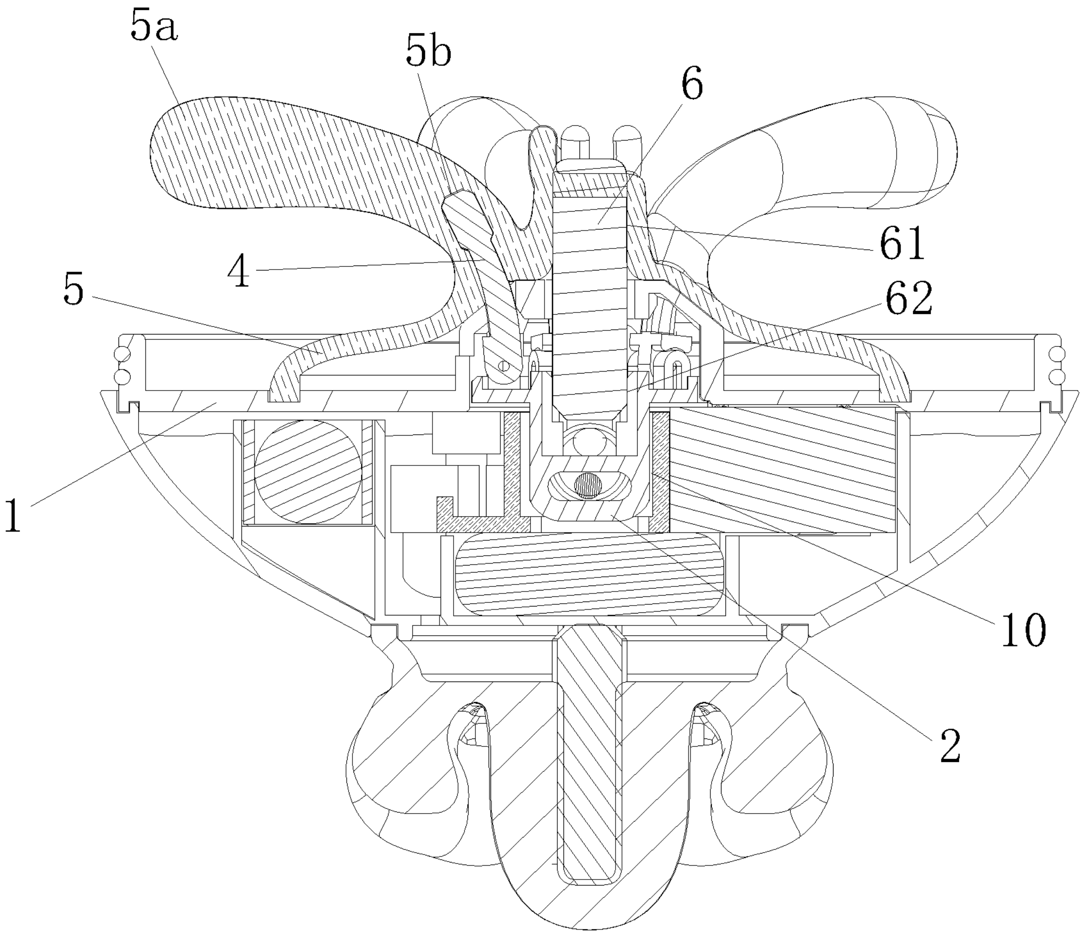
FIG. 2 is a sectional view of the present disclosure.
Figure 3:
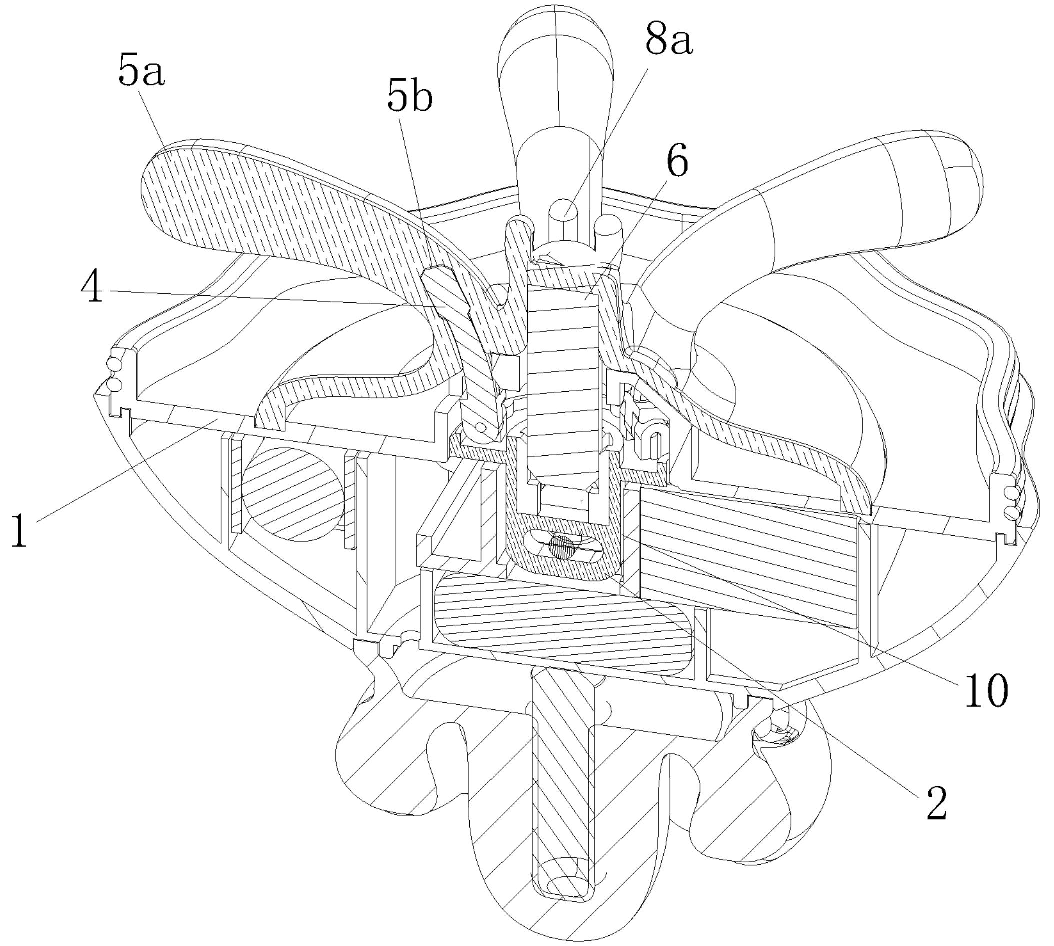
FIG. 3 is a semi-sectional view of the present disclosure.
Figure 4:
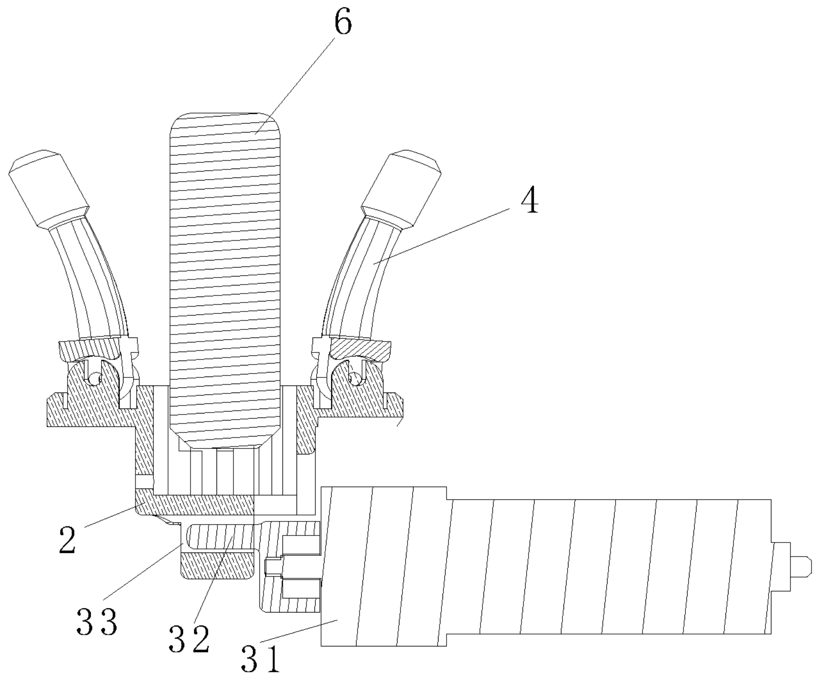
FIG. 4 is a sectional view of a driving portion of the present disclosure.
Figure 5:
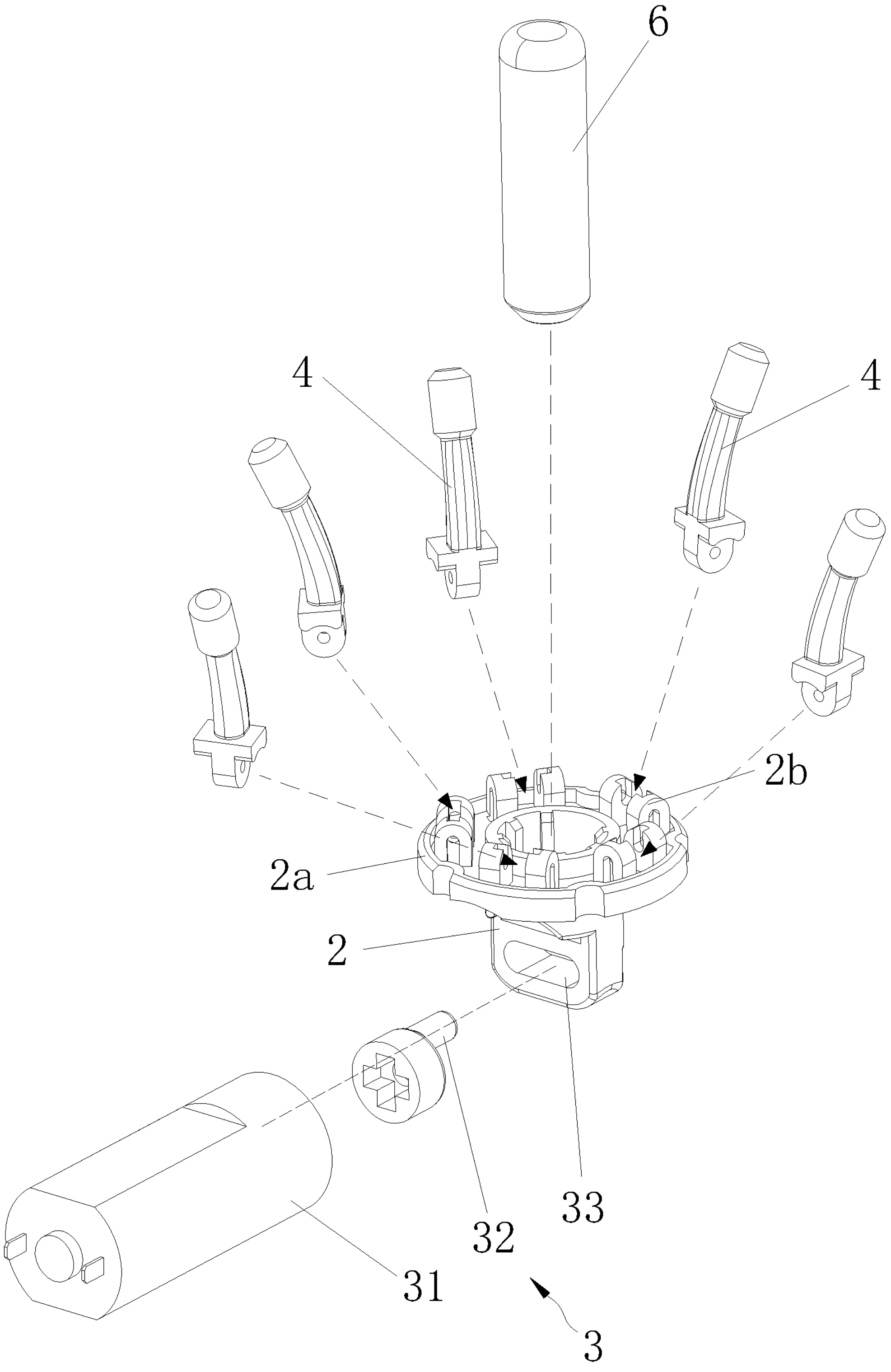
FIG. 5 is a partial exploded view of the present disclosure.
Figure 6:
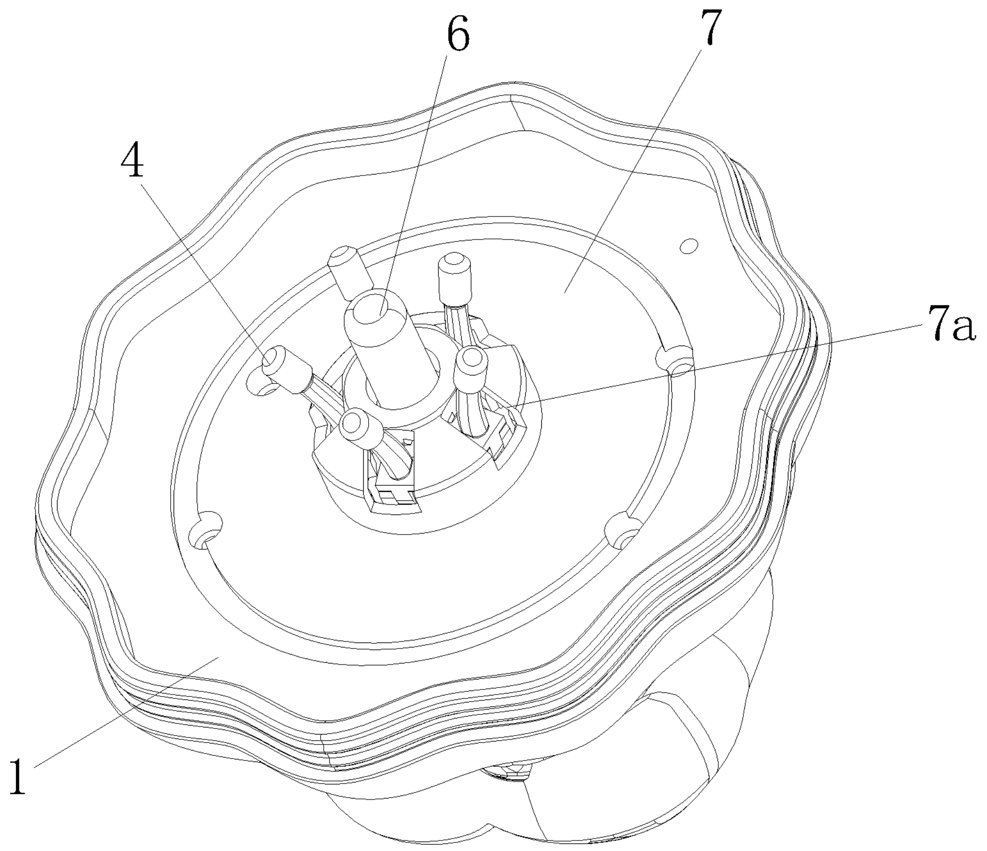
FIG. 6 is a schematic diagram after hiding the elastic layer.
Figure 7:
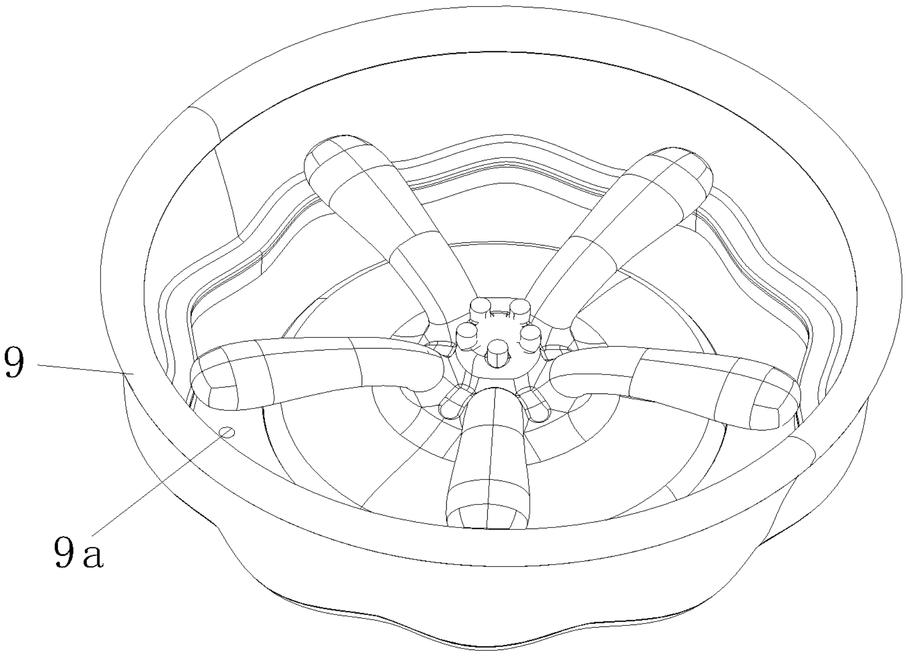
FIG. 7 is a structural diagram of a suction cover, a top shell and an elastic layer.
Figure 8:
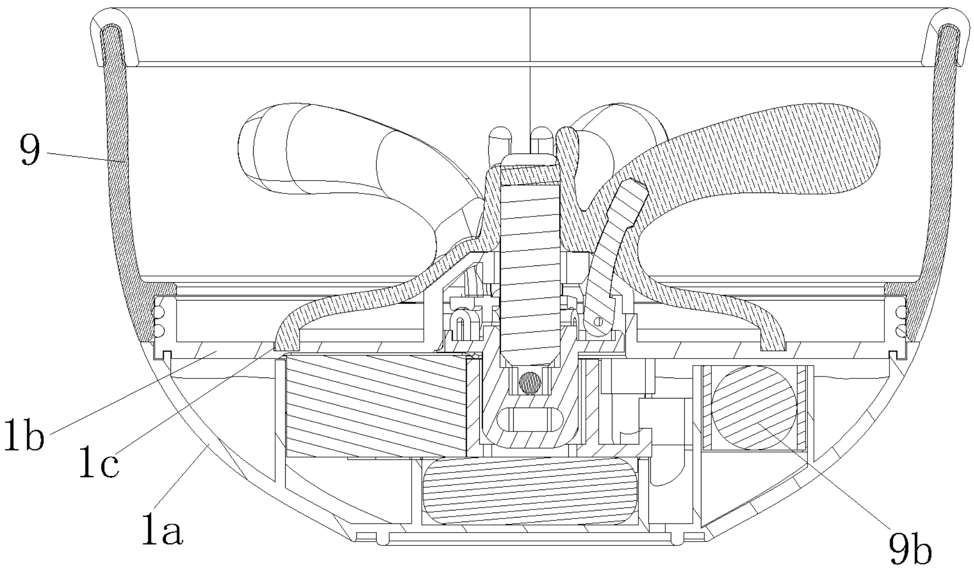
FIG. 8 is a sectional view including a suction cover.

As shown in FIG. 1 to FIG. 6, a multi-point stimulating sex product, comprising:

- a machine base 1, wherein the machine base 1 is provided with a guide hole 10 in a vertical direction;
- a sliding seat 2, wherein the sliding seat 2 is slidably mounted in the guide hole 10 in the vertical direction;
- a driving device 3, wherein the driving device 3 is arranged below the sliding seat 2, and the driving device 3 can drive the sliding seat 2 to move in the vertical direction;

a claw arm 4, a plurality of claw arms 4 are provided, wherein a lower end of the claw arm 4 is pivotally mounted on a side portion or an upper wall of the sliding seat 2; and an elastic layer 5, wherein the elastic layer 5 is provided on an upper wall of the machine base 1, a massage head 5*a* extends from the elastic layer 5, a plurality of massage heads 5*a* are provided, the massage head 5*a* is matched with the claw arm 4, a rear end of the massage head 5*a* is provided with a clamping hole 5*b*, and a front end of the claw arm 4 extends into the clamping hole 5*b*.

In practical design, when the sliding seat 2 moves in the vertical direction (essentially reciprocating in the vertical direction, thereby driving the massage head to swing back and forth), the front end of the claw arm 4 is subjected to the limiting effect of the massage head 5*a*. As the sliding seat 2 moves in the vertical direction, the sliding seat 2 drives the rear end of the claw arm 4 to swing back and forth, which in turn drives the massage head 5*a* to swing, imitating the movement trajectory of fingers (thereby enabling a plurality of claw arms 4 to swing between positions close to or far away from each other). This design enhances the comfort of the massage.

In the specific structure, the machine base 1 is provided with a lithium battery and a control device, and is connected to the rotating motor 31, thus controlling the opening or closing (such as movement frequency) of the claw arm 4.

Specifically, the massage head 5*a* is in a long strip shape, simulating the structure of fingers and increasing the stroke range of the end of the massage head 5*a*.

In another embodiment, the massage head 5*a* is in an arc shape.

In the embodiment of the present disclosure, a number of the claw arm 4 is five, but of course, the claw arm 4 can also be two, three, four, six, etc.

Specifically, an upper end of the sliding seat 2 is a positioning disk 2*a*, an upper wall of the positioning disk 2*a* is provided with a pivot portion 2*b*, a plurality of pivot portions 2*b* are provided, the pivot portions 2*b* are spaced apart and distributed in a circumferential direction of the positioning disk 2*a*, and a rear end of the claw arm 4 is mounted on the pivot portion 2*b* via a rotating shaft. Through the reasonable arrangement of the positioning disk 2*a*, the lower end of the claw arm 4 can have a larger range of activities, and at the same time, when the positioning disk 2*a* drives a plurality of claw arms 4, the claw arms 4 do not interfere with each other.

Specifically, the positioning disk 2*a* is preferably a circular disk, and the claw arm 4 is provided with blocking portions extending towards two sides. One of the blocking portions is located above the installation position of the claw arm 4 and the positioning disk 2*a*. The lower wall of one of the blocking portions is arc-shaped, and the upper end wall of the corresponding pivot portion of the claw arm 4 is also arc-shaped.

In another embodiment, a side wall of the sliding seat 2 is provided with pivot portions 2*b*, the pivot portions 2*b* are spaced apart and distributed in a circumferential direction of the sliding seat 2, and the rear end of the claw arm 4 is mounted on the pivot portion 2*b* via the rotating shaft.

In the embodiment of the present disclosure, a bottom of the sliding seat 2 is provided with a driving groove 33 that penetrates through the side wall of the sliding seat 2, the driving device 3 comprises a rotating motor 31 and an eccentric cam 32, the eccentric cam 32 is connected to the rotating motor 31, and the eccentric cam 32 extends into the driving groove 33. When the eccentric cam 32 drives the sliding seat 2 to move in the vertical direction, the rotary motion is converted into a linear motion.

Specifically, the driving groove 33 is strip-shaped, thereby matching with the circular trajectory of the eccentric cam 32, that is, the width and length of the driving groove 33 are both greater than the diameter of the stem of the eccentric cam 32, so that the stem of the eccentric cam 32 can move along the inner wall of the driving groove 33. Preferably, two ends of the driving groove 33 are arc-shaped (for example, semicircular).

In the embodiment of the present disclosure, both an output shaft of the rotating motor 31 and a rotating shaft of the eccentric cam 32 are horizontally arranged, thereby making the overall volume of the massage device smaller.

In another embodiment, the driving device 3 is a telescopic motor, or the driving device 3 is a rotating motor and a connecting rod, which can also drive the sliding seat 2 to move in the vertical direction.

Specifically, a middle of the upper wall of the sliding seat 2 is provided with a first connecting groove 61, a middle of the elastic layer 5 is provided with a middle massage protruding block 8, a lower wall of the middle massage protruding block 8 is provided with a second connecting groove 62, the second connecting groove 62 is matched with the first connecting groove 61, and a guide column 6 is arranged between the first connecting groove 61 and the second connecting groove 62. When the sliding seat 2 moves, it can drive the middle massage protruding block 8 to massage outwards through the guide column 6, thereby providing a more comprehensive massage effect. At the same time, the provision of the guide column 6 can improve the stability of the sliding seat 2 sliding in the vertical direction and play a guiding role.

When the sliding seat 2 slides in the vertical direction, the guide column 6 is arranged to drive the middle massage protruding block 8 to deform and reciprocate in the vertical direction.

Therefore, simultaneous stimulation of the vaginal opening and clitoris can be achieved, the touch of fingers can be effectively simulated, and the sensation of reciprocating expansion and contraction can also be realized, thereby effectively enhancing the overall experience.

In the embodiment of the present disclosure, the upper wall of the machine base 1 is provided with an outer cover 7, the outer cover 7 is provided with a hole position 7*a* for the claw arm 4 to extend out, and the hole position 7*a* is used for limiting a swing amplitude of the claw arm 4. The elastic layer 5 covers the outer cover 7, thereby improving the overall aesthetics and cleanliness of the massager.

Specifically, an upper wall of the middle massage protruding block 8 is provided with a plurality of protruding points 8*a* spaced apart, thereby enhancing the touch sensation of the massage.

Specifically, the machine base 1 comprises a base 1*a* and a top shell 1*b*, a middle of the top shell 1*b* is provided with a groove 1*c*, and a lower end wall of the elastic layer 5 is clamped in the groove 1*c*, thus facilitating the installation of the elastic layer 5 and ensuring the tightness of the middle position.

Specifically, an outer peripheral wall of the top shell 1*b* is provided with a suction cover 9, an air pump 9*b* is provided in the base 1*a*, the top shell 1*b* is provided with a through hole 9*a*, and the through hole 9*a* is communicated with the air pump 9*b*.

Specifically, the air pump 9*b* is used for adjusting an air pressure in the suction cover 9, forming positive pressure or negative pressure in the suction cover 9. By alternating between positive and negative pressure within the suction cover 9, negative pressure adsorption is applied to the female genitalia, which subsequently collaborates with the massage head 5*a* to stimulate the clitoris and vaginal opening.

Specifically, the suction cover 9 is made of rigid material or flexible material, such as silicone, providing a more comfortable touch.

Specifically, the massage head 5*a* is gradually expanded in diameter from bottom to top, allowing for a larger touch area.

Specifically, the claw arm 4 is strip-shaped and is provided with a curvature, providing a greater swing range.

The above are only preferred embodiments of the present disclosure, and do not limit the patent scope of the present disclosure. Any equivalent structural modifications made under the inventive concept of the present disclosure, utilizing the contents of the specification and drawings of the present disclosure, or the direct/indirect application in other related technical fields, are all included within the scope of patent protection of the present disclosure.

What is claimed is:

1. A multi-point stimulating sex product, comprising:

a machine base, wherein the machine base is provided with a guide hole in a vertical direction;

a sliding seat, wherein the sliding seat is slidably mounted in the guide hole in the vertical direction;

a rotating motor, wherein the rotating motor is used for driving the sliding seat to move in the vertical direction;

a first claw arm; amongst a plurality of claw arms is provided, wherein a lower end of the first claw arm is pivotally mounted on a side portion or an upper wall of the sliding seat; and an elastic layer, wherein the elastic layer is provided on an upper wall of the machine base, a first massage head amongst a plurality of massage heads extends from the elastic layer, the first massage head is matched with the first claw arm, a rear end of the first massage head is provided with a clamping hole, and a front end of the first claw arm extends into the clamping hole;

wherein a middle of the upper wall of the sliding seat is provided with a first connecting groove, a middle of the elastic layer is provided with a middle massage protruding block, a lower wall of the middle massage protruding block is provided with a second connecting groove, the second connecting groove is matched with the first connecting groove, and a guide column is arranged between the first connecting groove and the second connecting groove; and when the sliding seat slides in the vertical direction, the guide column is arranged to drive the middle massage protruding block to deform and reciprocate in the vertical direction.

2. The multi-point stimulating sex product according to claim 1, wherein the first massage head is in an arc shape.

3. The multi-point stimulating sex product according to claim 1, wherein a number of the plurality of claw arm is five.

4. The multi-point stimulating sex product according to claim 1, wherein an upper end of the sliding seat is a positioning disk, an upper wall of the positioning disk is provided with a first pivot portion, amongst a plurality of pivot portions the plurality of pivot portions are spaced apart and distributed in a circumferential direction of the positioning disk, and a rear end of the first claw arm is mounted on the first pivot portion.

5. The multi-point stimulating sex product according to claim 1, wherein a side wall of the sliding seat is provided with the plurality of pivot portions, the plurality of pivot portions are spaced apart and distributed in a circumferential direction of the sliding seat, and the rear end of the first claw arm is mounted on the first pivot portion.

6. The multi-point stimulating sex product according to claim 1, wherein a bottom of the sliding seat is provided with a driving groove, the rotating motor comprises an eccentric cam, the eccentric cam is connected to the rotating motor, and the eccentric cam extends into the driving groove.

7. The multi-point stimulating sex product according to claim 6, wherein the driving groove penetrates through the bottom of the sliding seat.

8. The multi-point stimulating sex product according to claim 6, wherein both an output shaft of the rotating motor and a rotating shaft of the eccentric cam are horizontally arranged.

9. The multi-point stimulating sex product according to claim 1, wherein the rotating motor is a telescopic motor.

10. The multi-point stimulating sex product according to claim 1, wherein an upper wall of the middle massage protruding block is provided with a plurality of protruding points spaced apart.

11. The multi-point stimulating sex product according to claim 1, wherein the machine base comprises a base and a top shell, a middle of the top shell is provided with a groove, and a lower end wall of the elastic layer is clamped in the groove.

12. The multi-point stimulating sex product according to claim 11, wherein an outer peripheral wall of the top shell is provided with a suction cover, an air pump is provided in the base, the top shell is provided with a through hole, and the through hole is communicated with the air pump.

13. The multi-point stimulating sex product according to claim 12, wherein the air pump is used for adjusting an air pressure in the suction cover, forming positive pressure or negative pressure in the suction cover.

14. The multi-point stimulating sex product according to claim 13, wherein the suction cover is made of rigid material or flexible material.

15. The multi-point stimulating sex product according to claim 1, wherein the first massage head is gradually expanded in diameter from bottom to top.

16. The multi-point stimulating sex product according to claim 1, wherein the first claw arm is provided with a curvature.

* * * * *